(12) United States Patent
Hong

(10) Patent No.: US 8,113,191 B2
(45) Date of Patent: Feb. 14, 2012

(54) FLAME TAMERS AND ARRANGEMENT THEREOF FOR BARBEQUE GRILLS

(75) Inventor: David Hong, Hong Kong (CN)

(73) Assignee: Winners Products Engineering Ltd., Hong Kong (CN)

( * ) Notice: Subject to any disclaimer, the term of this patent is extended or adjusted under 35 U.S.C. 154(b) by 209 days.

(21) Appl. No.: 12/553,606

(22) Filed: Sep. 3, 2009

(65) Prior Publication Data

US 2011/0048399 A1    Mar. 3, 2011

(51) Int. Cl.
*A47J 37/07* (2006.01)
(52) U.S. Cl. ............... 126/25 R; 126/39 R; 126/39 E
(58) Field of Classification Search ............. 126/41 R, 126/39 K, 39 J, 25 R, 39 R, 39 E; 99/444, 99/445, 446, 447
See application file for complete search history.

(56) References Cited

U.S. PATENT DOCUMENTS

| 5,277,106 | A | * | 1/1994 | Raymer et al. ............... 99/447 |
| 5,617,778 | A | | 4/1997 | Schroeter et al. |
| 6,187,359 | B1 | | 2/2001 | Zuccarini |
| 6,332,395 | B1 | | 12/2001 | Home |
| 2004/0025862 | A1 | * | 2/2004 | Lor et al. ..................... 126/41 R |

* cited by examiner

*Primary Examiner* — Alfred Basichas
(74) *Attorney, Agent, or Firm* — Pai Patent & Trademark Law Firm; Chao-Chang David Pai

(57) ABSTRACT

Flame tamers for bridging on a barbeque burner box above heat sources of a barbeque grill to distribute heat energy evenly over the barbeque cooking surface have protruding openings extending toward one more of the peripheral walls of the barbeque burner box so that foods on the cooking surface can be cooked evenly and efficiently, thus saving much energy consumption.

8 Claims, 5 Drawing Sheets

FLAME TAMERS AND ARRANGEMENT THEREOF FOR BARBEQUE GRILLS

BACKGROUND OF THE INVENTION (a) Field of the Invention

The present invention relates to a design of flame tamer for use in a barbeque burner box and more particularly to flame tamers that have protruding openings for guiding the heat energy from heat sources toward particular directions so that the heat energy can be evenly distributed to enhance the cooking efficiency. The invention relates also to ways of arrangement of the flame tamers in the barbeque burner box.

(b) Description of the Prior Art

A known flame tamer for a barbeque burner box is to be bridged on a barbeque burner box above a heat source. This design of flame tamer has a double-beveled configuration. Small holes may be made on the flame tamer for allowing upward hot air to pass. However, this design of flame tamer cannot distribute heat energy evenly throughout the whole area of the barbeque cooking surface. During cooking, there is a temperature difference between the hot spot around the center of the barbeque cooking surface and the cold spot around the border of the barbeque grill. This temperature difference results in low cooking efficiency and waste of fuel energy, and the food tends to be overcooked or undercooked.

U.S. Pat. No. 6,332,395 teaches the use of a board in a barbeque burner box above a heat source to enhance heat distribution. However, this arrangement cannot evenly distribute heat energy throughout the whole cooking area. U.S. Pat. No. 5,617,778 teaches the application of apertures to guide heat source. This measure still cannot achieve even distribution of heat source. U.S. Pat. No. 6,187,359 teaches the use of a resistant metal plate for placing over the burners. The plate has a series of louvered openings which allow heat to rise from the barbeque flames while blocking the flames.

Because conventional designs cannot guide heat source to be evenly distributed over the whole area of the barbeque cooking surface, the temperature around the center area of the barbeque cooking surface will be relatively higher than the border area of the barbeque cooking surface, resulting in low cooking efficiency and waste of fuel gas.

SUMMARY OF THE INVENTION

The present invention has been accomplished under the circumstances in view. It is one object of the present invention to provide a flame tamer for bridging in a barbeque burner box in a barbeque grill set to distribute heat energy evenly over the barbeque cooking surface so that the food can be cooked evenly and efficiently, thus saving much energy consumption.

To achieve this and other objects of the present invention, a flame tamer for use in a barbeque burner box is to be bridged on two opposite peripheral walls, namely, the front and rear walls of the barbeque burner box, having at least one protruding opening for guiding the hot air from the heat source in the barbeque burner box toward at least one of the peripheral walls of the barbeque burner box so that the food can be cooked evenly and efficiently on the barbeque cooking surface.

In one application example, a left flame tamer, a right flame tamer and at least one middle flame tamer are bridged on the front wall and rear wall of the barbeque burner box above the heat sources. The left flame tamer is disposed close to the left sidewall of the barbeque burner box, having at least one first protruding opening extending in a direction toward the left sidewall of the barbeque burner box and at least one second protruding opening extending in a direction toward the front wall of the barbeque burner box. The right flame tamer is disposed close to the right sidewall of the barbeque burner box, having at least one first protruding opening extending in a direction toward the right sidewall of the barbeque burner box and at least one second protruding opening extending in a direction toward the front wall of the barbeque burner box. The at least one middle flame tamer is set between the left flame tamer and the right flame tamer. Each middle flame tamer has at least one first protruding opening disposed at one end thereof and extending in a direction toward the front wall of the barbeque burner box.

DETAILED DESCRIPTION OF THE PREFERRED EMBODIMENTS

Figure 1:
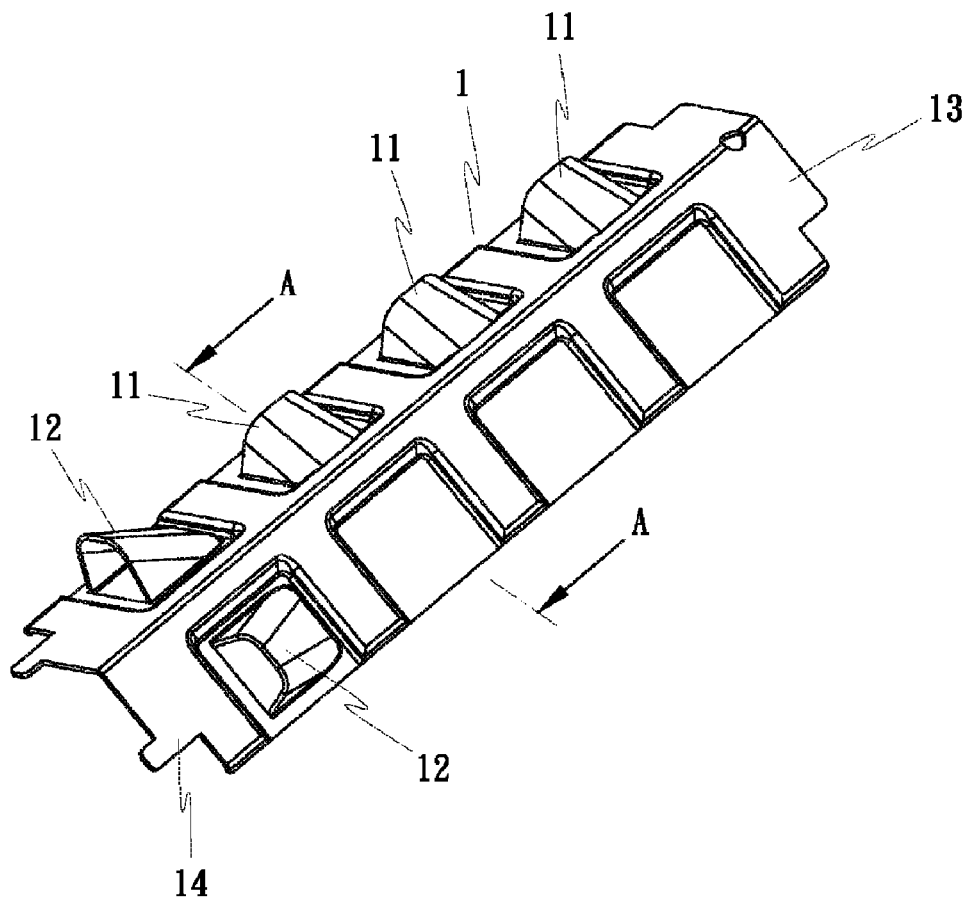
FIG. 1 is a perspective view of a flame tamer in accordance with a first embodiment of the present invention.
Figure 2:
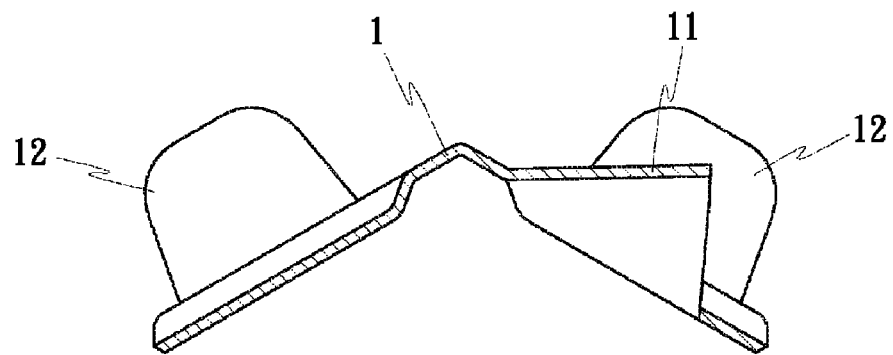
FIG. 2 is a sectional view taken along line A-A of FIG. 1.

Referring to FIGS. 1~6, first, second and third flame tamers 1;2;3 constructed according to the first, second and third embodiments of the present invention are shown. As shown in FIG. 7, a barbeque burner box 4 of a barbeque grill set has four peripheral walls 41, 42, 43 and 44. The flame tamers 1, 2, 3 commonly have at least one protruding opening facing one of the peripheral walls 41, 42, 43 or 44 of the barbeque burner box 4 (see FIG. 7) for guiding the upward flow of hot air from the heat sources 5 (see FIG. 8 and FIG. 9) toward the cold spot of the barbeque burner box 4 to rapidly and evenly distribute the thermal energy over the whole area of the barbeque grill 6 to cook the food on the barbeque grill 6, thereby saving energy consumption and preventing the food from being unevenly cooked.

Referring to FIG. 7 and FIGS. 1 and 2 again, the first flame tamer 1 in accordance with the first embodiment of the present invention is supported between two opposite peripheral walls, namely, the front wall 42 and the rear wall 44 of the barbeque burner box 4 near one side wall 41 (the left side of the barbeque burner box 4), having at least one, for example three, first protruding openings 11 arranged in line and extending in a direction toward the left side wall 41 and at least one, for example two, second protruding openings 12 extending in a direction toward the front wall 42.

Figure 3:
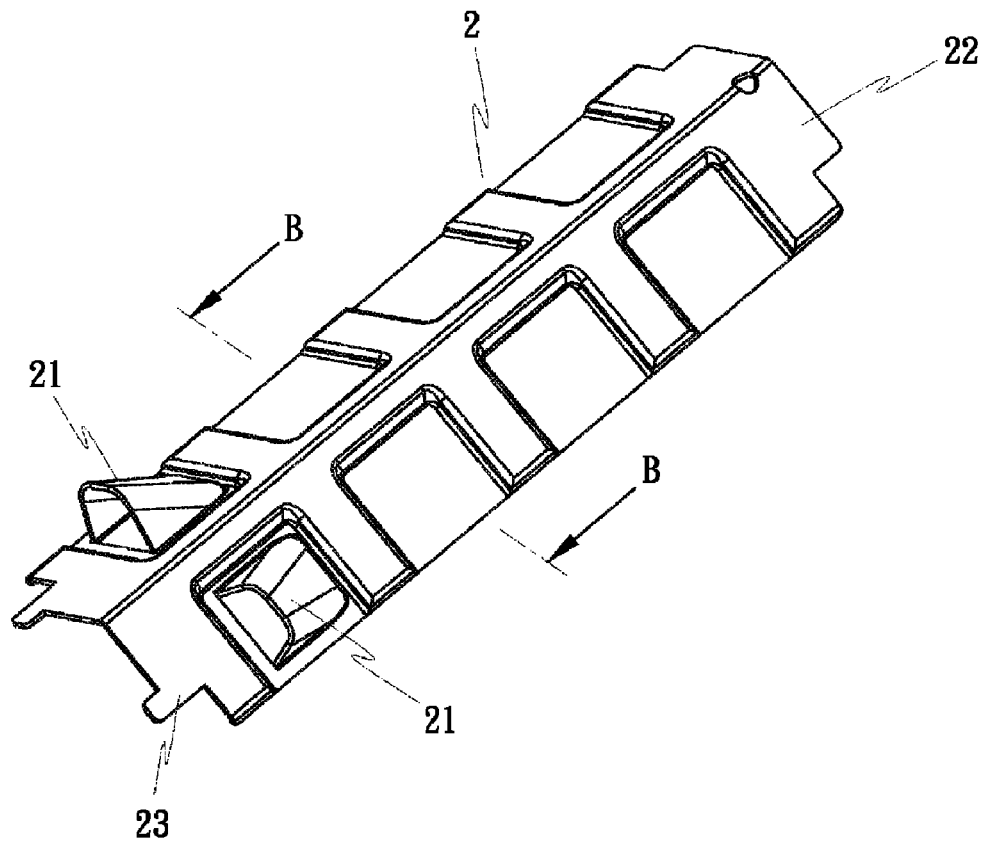
FIG. 3 is a perspective view of a flame tamer in accordance with a second embodiment of the present invention.
Figure 4:
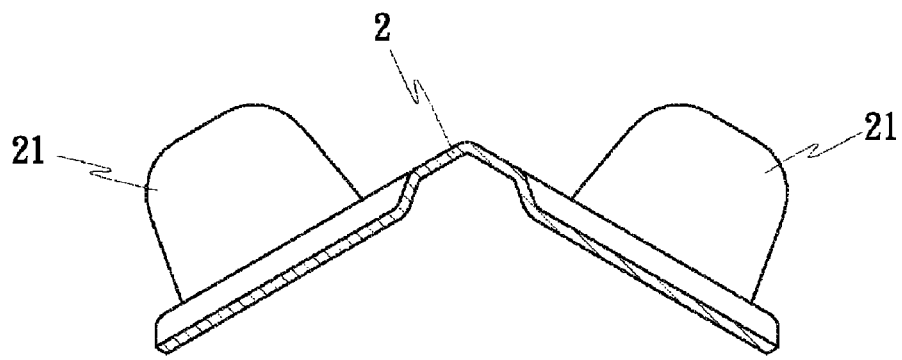
FIG. 4 is a sectional view taken along line B-B of FIG. 3.

Referring to FIG. 3, FIG. 4 and FIG. 7 again, at least one second flame tamer 2 in accordance with the second embodiment of the present invention is supported between the front wall 42 and the rear wall 44 of the barbeque burner box 4 in the middle, having at least one, for example two, protruding openings 21 extending in a direction toward the front wall 42. The number of the second flame tamer 2 to be bridged on the barbeque burner box 4 is determined according to the size of the barbeque burner box 4. According to the application example shown in FIG. 7, two pieces of second flame tamers 2 are bridged on the barbeque burner box 4 in the middle.

Figure 5:
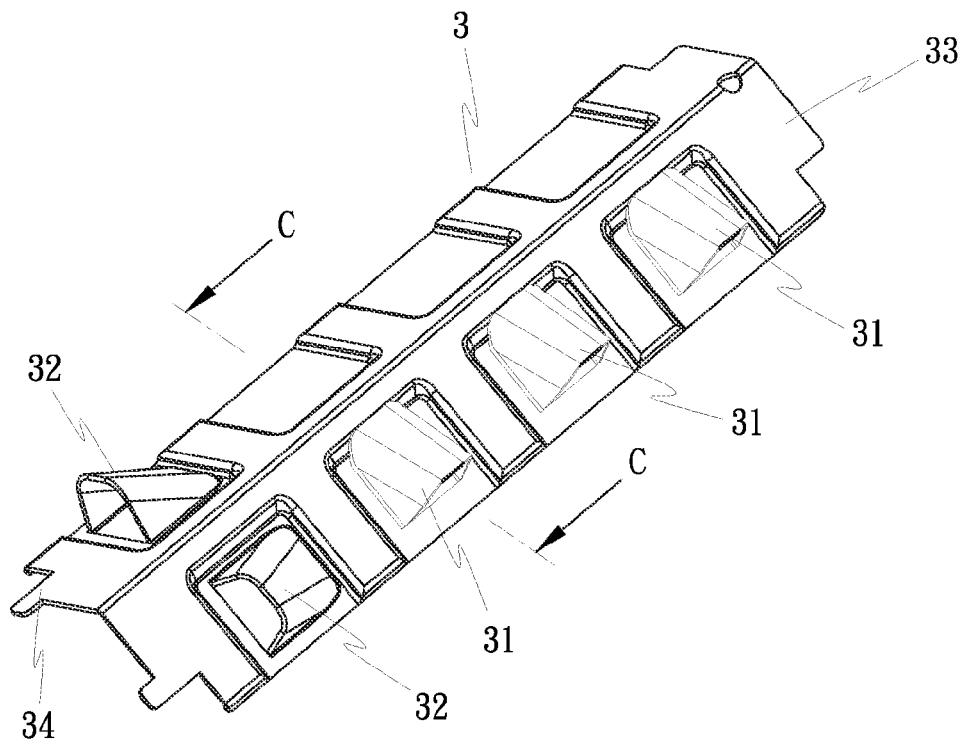
FIG. 5 is a perspective view of a flame tamer in accordance with a third embodiment of the present invention.
Figure 6:
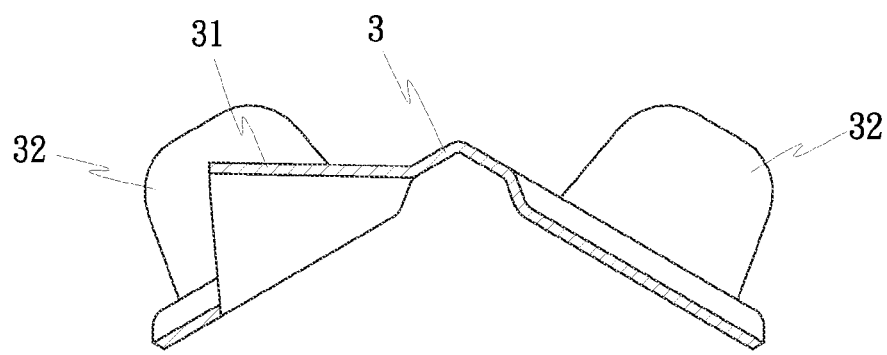
FIG. 6 is a sectional view taken along line C-C of FIG. 5.
Figure 7:
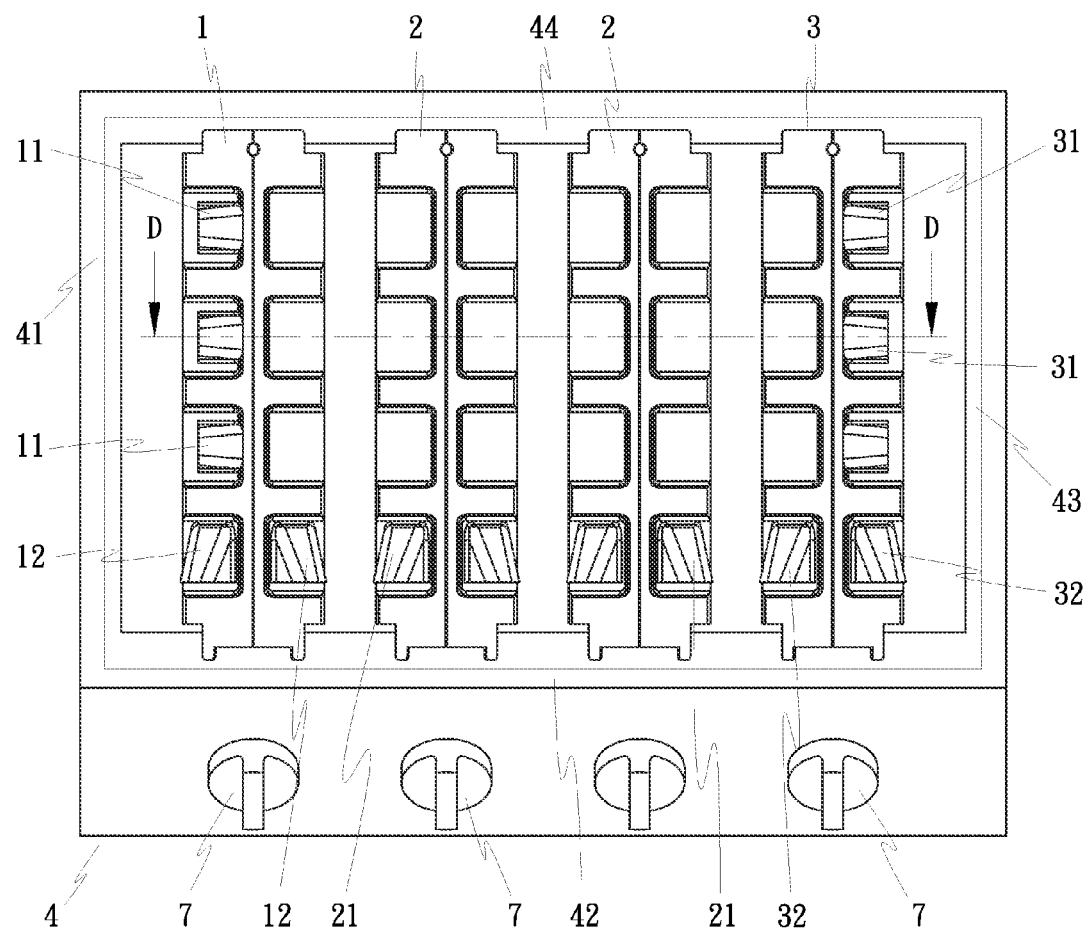
FIG. 7 is a top view of the present invention, showing flame tamers of the first, second and third embodiments arranged on a barbeque burner box.

Referring to FIG. 5, FIG. 6 and FIG. 7 again, the third flame tamer 3 in accordance with the third embodiment of the present invention is supported between the front wall 42 and the rear wall 44 of the barbeque burner box 4 near the other side wall 43 (the right side of the barbeque burner box 4), having at least one, for example three, first protruding openings 31 arranged in line and extending in a direction toward the right side wall 43 of the barbeque burner box 4 and at least one, for example two, second protruding openings 32 extending in a direction toward the front wall 42.

Figure 8:
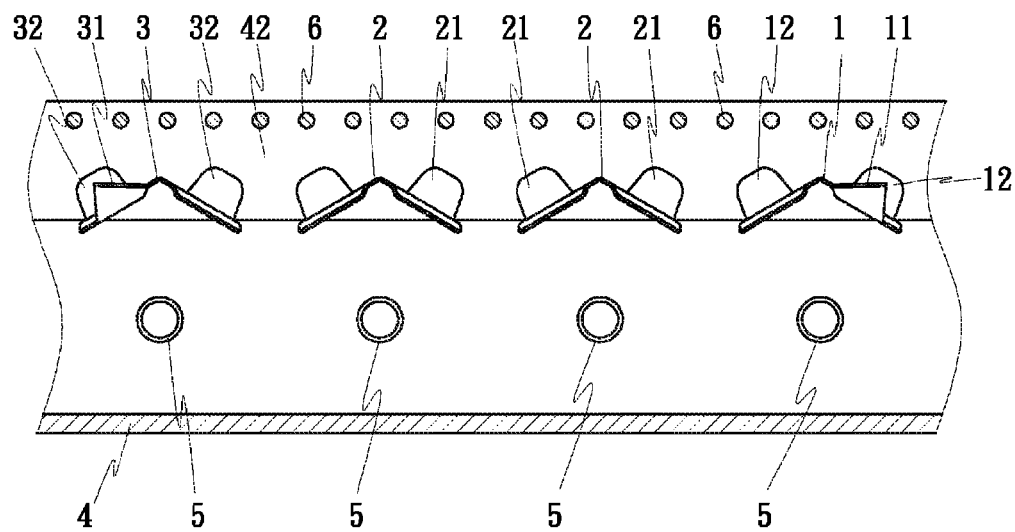
FIG. 8 is a sectional view taken along line D-D of FIG. 7.
Figure 9:
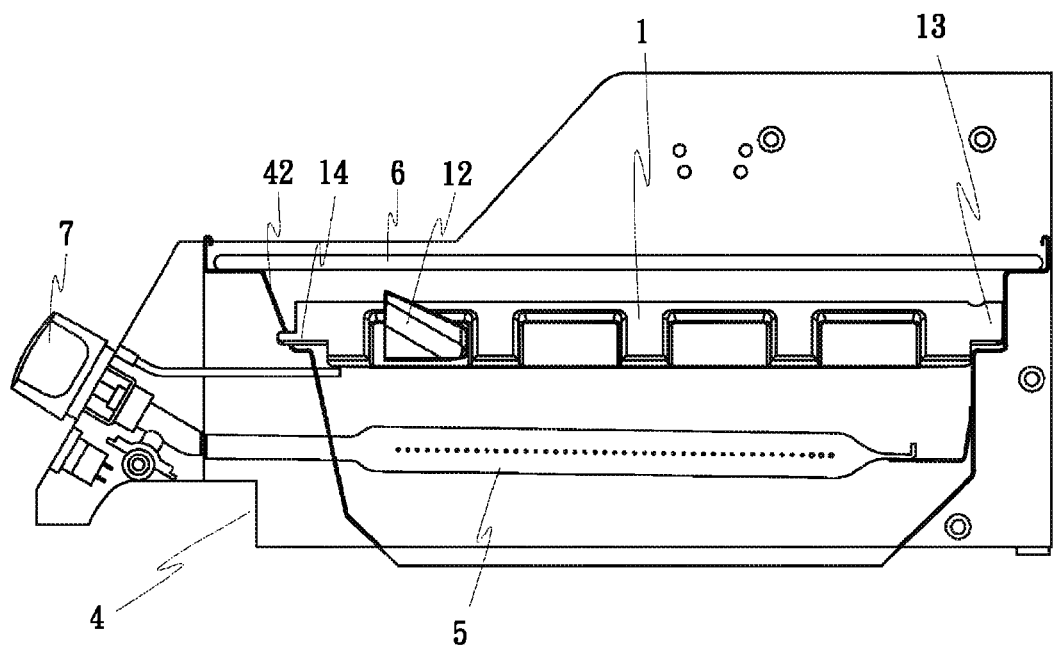
FIG. 9 is schematic sectional assembly of the present invention, showing the flame tamers bridged on the barbeque burner box above the heat sources.

Referring to FIG. 8, the aforesaid flame tamers 1, 2 and 3 are bridged on the barbeque burner box 4 above the heat sources 5. According to this application example, the heat sources 5 are elongated gas burners (see FIG. 9) controllable by respective burner control knobs 7. When the head sources 5 are activated, heat energy is transferred to the flame tamers 1, 2 and 3 and evenly distributed through the whole area of the barbeque grill 6. At the same time, the protruding openings 11, 12, 21, 31 and 32 of the flame tamers 1, 2 and 3 guide part of the heat energy toward the border area of the barbeque burner box 4 so that heat energy is evenly distributed throughout the whole area of the barbeque grill 6 to cook food thoroughly, thus achieving high cooking efficiency and preventing the food from being overcooked or undercooked.

Each of the flame tamers 1, 2 and 3 has a plate body with a double-beveled configuration. Each of the protruding openings (11, 12, 21, 31 or 32) comprises an opening on the plate body and a chute protruding over the opening in a certain direction for guiding the hot air flowing through the opening. Except the protruding openings 11, 12, 21, 31 or 32, the plate body forming each of the flame tamers is an enclosed surface. To reinforce the structural strength and heat transfer effect, the flame tamers 1, 2 and 3 preferably have a concave convex surface configuration. The flame tamer 1 further has a front extension portion 14 and a rear extension portion 13 for supporting on the front wall 42 and the rear wall 44 of the barbeque burner box 4 respectively. Similarly, the flame tamer 2 further has a front extension portion 23 and a rear extension portion 22, and the flame tamer 3 further has a front extension portion 34 and a rear extension portion 33, for supporting on the front wall 42 and the rear extension wall 44 respectively.

There is no any special limitation on the configuration of the barbeque burner box 4. The heat sources 5 of the barbeque burner box 4 are not limited to fuel gas. Further, the configurations of the flame tamers 1, 2 and 3 may be changed, however the protruding openings 11, 12, 21, 31 and 32 are requisite structural features. As far as the length, width and material are concerned, they are determined according to actual needs. However, excellent heat distribution is necessary. Further, the shape, opening and elevation angle of the protruding openings 11, 12, 21, 31 and 32 as well as the positioning structure between the flame tamers 1, 2 and 3 and the front wall 42 and the rear wall 44 of the barbeque burner box 4 can be altered.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A flame tamer for bridging on a barbeque burner box above heat sources in said barbeque burner box to distribute heat energy from the heat sources evenly in said barbeque burner box, said flame tamer having at least one protruding opening facing toward a first peripheral wall of said barbeque burner box, and at least one protruding opening facing toward a second peripheral wall of said barbeque burner box, wherein the first peripheral wall is immediately adjacent to and substantially perpendicular to the second peripheral wall.

2. The flame tamer as claimed in claim 1, wherein said flame tamer is bridged on a front wall and a rear wall between a left sidewall and a right sidewall of said barbeque burner box and disposed close to said left sidewall, and said first peripheral wall is the left sidewall and said second peripheral wall is the front wall.

3. The flame tamer as claimed in claim 1, wherein said flame tamer is bridged on a front wall and a rear wall between a left sidewall and a right sidewall of said barbeque burner box and disposed close to said right sidewall, and said first peripheral wall is the right sidewall and said second peripheral wall is the front wall.

4. The flame tamer as claimed in claim 1, which has a plate body with a curved configuration.

5. The flame tamer as claimed in claim 1, which has an enclosed surface area except where said at least one protruding opening is formed.

6. The flame tamer as claimed in claim 1, which comprises a plate body with one or more concave or convex surface portions.

7. The flame tamer as claimed in claim 1, which has a front extension portion and a rear extension portion respectively extending from front and rear ends thereof for bridging on two opposite peripheral walls of said barbeque burner box.

8. A flame tamer and barbeque burner box arrangement, comprising
a barbeque burner box having a front wall, a rear wall, a left sidewall substantially perpendicular to the front wall and the rear wall and a right sidewall substantially perpendicular to the front wall and the rear wall,
a set of flame tamers including a left flame tamer, a right flame tamer and at least one middle flame tamer, each said flame tamer bridged on the front wall and the rear wall of said barbeque burner box above heat sources, and
a barbeque grill in said barbeque burner box, wherein:
said left flame tamer is disposed close to the left sidewall of said barbeque burner box, having at least one first protruding opening facing toward the left sidewall of said barbeque burner box and at least one second protruding opening facing toward the front wall of said barbeque burner box;
said right flame tamer is disposed close to the right sidewall of said barbeque burner box, having at least one first protruding opening facing toward the right sidewall of said barbeque burner box and at least one second protruding opening facing toward the front wall of said barbeque burner box; and
said at least one middle flame tamer is set between said left flame tamer and said right flame tamer, each said middle flame tamer having at least one first protruding opening disposed at a front end thereof and facing toward the front wall of said barbeque burner box.

* * * * *